United States Patent
McBain

(10) Patent No.: US 6,810,310 B1
(45) Date of Patent: Oct. 26, 2004

(54) ANTI-TERRORIST AIRCRAFT PILOT SENSOR SYSTEM AND METHOD

(76) Inventor: Theodore McBain, 1335 N. Lake Blvd., Tahoe City, CA (US) 96145

( * ) Notice: Subject to any disclaimer, the term of this patent is extended or adjusted under 35 U.S.C. 154(b) by 0 days.

(21) Appl. No.: 10/262,559

(22) Filed: Sep. 30, 2002

Related U.S. Application Data

(63) Continuation-in-part of application No. 10/251,666, filed on Sep. 19, 2002.
(60) Provisional application No. 60/323,754, filed on Sep. 19, 2001.

(51) Int. Cl.[7] .............................................. B64C 7/00
(52) U.S. Cl. ....................................... 701/3; 244/118.5
(58) Field of Search ............................. 701/35, 3, 11; 244/118.5, 75 R; 340/945, 540, 573.1, 574, 426.24; 380/258

(56) References Cited

U.S. PATENT DOCUMENTS

| | | | |
|---|---|---|---|
| 4,390,861 A | 6/1983 | Cohen et al. | 340/27 R |
| 4,586,387 A | 5/1986 | Morgan et al. | 73/862.05 |
| 4,914,721 A | 4/1990 | Glaeser et al. | 307/116 |
| 5,479,162 A | 12/1995 | Barger et al. | 340/945 |
| 5,686,765 A | 11/1997 | Washington | 307/10.5 |
| 5,938,706 A | 8/1999 | Feldman | 701/32 |
| 6,311,272 B1 | 10/2001 | Gressel | 713/186 |
| 6,348,877 B1 * | 2/2002 | Berstis et al. | 340/980 |
| 6,584,383 B2 * | 6/2003 | Pippenger | 701/3 |
| 2001/0026316 A1 | 10/2001 | Senatore | 348/148 |
| 2002/0093565 A1 | 7/2002 | Walkins | 348/148 |
| 2002/0111777 A1 | 8/2002 | David | 702/189 |
| 2003/0050745 A1 * | 3/2003 | Orton | 701/3 |
| 2003/0052798 A1 * | 3/2003 | Hanson | 340/945 |
| 2003/0055540 A1 * | 3/2003 | Hansen | 701/3 |
| 2003/0055541 A1 * | 3/2003 | Haley | 701/11 |
| 2003/0062447 A1 * | 4/2003 | Cordina et al. | 244/118.5 |
| 2003/0093193 A1 * | 5/2003 | Pippenger | 701/3 |

FOREIGN PATENT DOCUMENTS

| | | | |
|---|---|---|---|
| FR | 2584842 | * | 1/1965 |
| FR | 2107798 | * | 5/1972 |
| FR | 2192343 | * | 2/1974 |

* cited by examiner

*Primary Examiner*—Marthe Y. Marc-Coleman
(74) *Attorney, Agent, or Firm*—Sierra Patent Group, Ltd.

(57) ABSTRACT

An anti-terrorist aircraft pilot sensor system is disclosed. The anti-terrorist pilot sensor system comprises a pilot sensor and an aircraft central processor unit operatively coupled to the pilot sensor. The aircraft central processor unit includes a transceiver operatively coupled to the aircraft central processor unit. An autopilot of the aircraft is operatively coupled to the aircraft central processor unit. A ground control remote from the aircraft is operatively coupled to the aircraft central processor unit and the ground control includes a transceiver coupled to the ground control. An aircraft override is operatively coupled to the ground control and is operatively coupled to the aircraft central processor unit. A divert element is operatively coupled to the central processor unit and the divert element includes a transceiver. The ground control is in operative communication with the divert element. A protected object including a transceiver and a divert beacon is in operative communication with the divert element. A method of operating an anti-terrorist aircraft pilot sensor system comprises activating the anti-terrorist aircraft pilot sensor system. The method includes detecting a divert beacon transmitted from a protected object. The method includes transmitting a signal from a divert element to a central processor unit of the aircraft that the divert beacon exists. The method includes processing the signal in the central processor unit and activating an aircraft autopilot onto a divert flight path.

14 Claims, 5 Drawing Sheets

US 6,810,310 B1

ANTI-TERRORIST AIRCRAFT PILOT SENSOR SYSTEM AND METHOD

CROSS REFERENCE TO RELATED APPLICATIONS

This application is a Continuation-in-part application that claims priority to an earlier filed U.S. Non-Provisional Application 10/251,666 filed Sep. 19, 2002, that claims priority to a U.S. Provisional Application number 60/323,754, filed Sep. 19, 2001.

BACKGROUND

The present disclosure relates to the field of anti-terrorist security systems for commercial aircraft. In particular, the present disclosure relates to an anti-terrorist aircraft pilot sensor system.

In current aircraft, pilots and/or flight crews are vulnerable to catastrophic events that may place the aircraft and all individuals aboard the aircraft in jeopardy. Events, such as physical mishaps and even terrorist attacks on the pilot and crew are possible. If the pilot and crew capable of operating the aircraft become disabled then the aircraft could be placed into peril. Also, if terrorists or highjackers disable the pilot, then they can take command of the aircraft and use it for their own sinister interests that may place others into risk or injury or even death. What is needed is a system that can prevent the risks of injury and even great tragedy due to the loss of a pilot or aircraft highjacking.

SUMMARY

The disclosed device is directed toward an anti-terrorist aircraft pilot sensor. The anti-terrorist pilot sensor system comprises a pilot sensor and an aircraft central processor unit operatively coupled to the pilot sensor. The aircraft central processor unit includes a transceiver operatively coupled to the aircraft central processor unit. An autopilot of the aircraft is operatively coupled to the aircraft central processor unit. A ground control remote from the aircraft is operatively coupled to the aircraft central processor unit and the ground control includes a transceiver coupled to the ground control. An aircraft override is operatively coupled to the ground control and is operatively coupled to the aircraft central processor unit. A divert element is operatively coupled to the central processor unit and the divert element includes a transceiver. The ground control is in operative communication with the divert element. A protected object including a transceiver and a divert beacon is in operative communication with the divert element.

The disclosed method is directed toward a method of operating an anti-terrorist aircraft pilot sensor system. The method of operating an anti-terrorist aircraft pilot sensor system comprises activating the anti-terrorist aircraft pilot sensor system. The method includes detecting a divert beacon transmitted from a protected object. The method includes transmitting a signal from a divert element to a central processor unit of the aircraft that the divert beacon exists. The method includes processing the signal in the central processor unit and activating an aircraft autopilot onto a divert flight path. system. The anti-terrorist aircraft pilot sensor system comprises

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
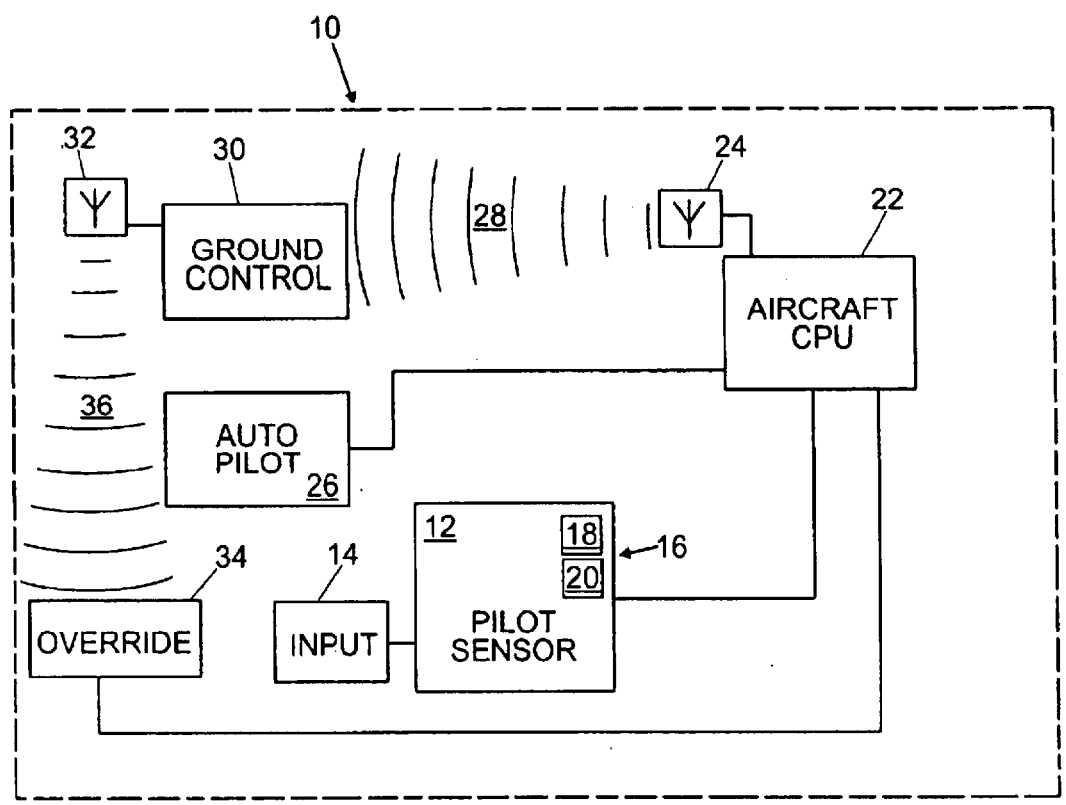
FIG. 1 is a schematic of an exemplary anti-terrorist aircraft pilot sensor system.

FIG. 1 illustrates a schematic of an exemplary anti-terrorist aircraft pilot sensor system, or simply, pilot sensor system 10. The pilot sensor system 10 includes a pilot sensor 12. The pilot sensor 12 is operatively coupled to an input component 14 that provides data input for activation and deactivation of the pilot sensor 12. For example, the input component 14 can be a keypad with alphanumeric keys that are configured to accept user inputs, such as, a code in order to activate or deactivate the pilot sensor 12. The input component 14 can also be audio or video, bar code reader, microphone, camera, thermal imager, eye retinal scanner or any combination thereof, for inputting a code to activate the pilot sensor 12. The pilot sensor 12 comprises a sensor or a plurality of sensors 16 that sense various biometric and/or physiological information of at least one of a pilot and co-pilot of the aircraft. Fingerprints or eye retina patterns are non-limiting examples of biometric information sensed by the sensors 16. The sensors 16 can also measure physiological parameters, such as heart rate, blood pressure, pulse, and the like. The sensors 16 can be specific to the parameters sensed, such as a biometric sensor 18 or a physiological sensor 20. The biometric sensor 18 senses biometric parameters, such as, fingerprints, eye retina patterns, and the like. The physiological sensor 20 senses physiological parameters such as heart rate, blood pressure, pulse, or even adrenaline levels, and the like.

The pilot sensor 12 is operatively coupled to an aircraft central processor unit 22. The aircraft central processor unit 22 includes a processor, micro-processor and any combination thereof, such that information can be processed, and programs can be executed. The aircraft central processor 22 also includes communication busses, memories, memory busses and input/output (I/O) circuitry, such that information can be processed and signals transmitted and received. A transceiver 24 is operatively coupled to the aircraft central processor 22. Signals can be transmitted and received by wireless communication via the transceiver 24. The aircraft central processor 22 receives inputs from the pilot sensor 12 and operates certain functions based on the inputs from the pilot sensor 12. The aircraft central processor 22 is operatively coupled to the autopilot 26. The aircraft central processor 22 can perform the function of placing the aircraft on an autopilot control 26. Autopilot 26 is the automatic flight control of the aircraft along a flight path without pilot intervention. The aircraft central processor 22 can also perform the function of transmitting an emergency signal 28 to a ground control 30. The emergency signal 28 can include information vital to the safety of the aircraft, such as location, heading, altitude, aircraft system operating parameters, distress messages and the like. The aircraft central processor 22 can send the emergency signal 28 via the transceiver 24. The ground control 30 being operatively coupled to a transceiver 32 can also communicate with the aircraft central processor 22. In one embodiment, the ground control 30 can send and receive information to and from the aircraft central processor unit 22 in addition to the emergency signal 28. The aircraft operability conditions taken from instrumentation and controls, audio and video information within the cabin of the aircraft, and the like, can be provided to the ground control 30. The ground control 30 is also operatively coupled to an emergency override 34. The emergency override, or simply override, 34 can be activated to override certain functions of the aircraft, such as the autopilot 26. An emergency override signal can be transmitted via wireless communications to the override 34 from the ground control 32 in order to deactivate the autopilot 26 and place the aircraft into manual flight control.

Figure 2:
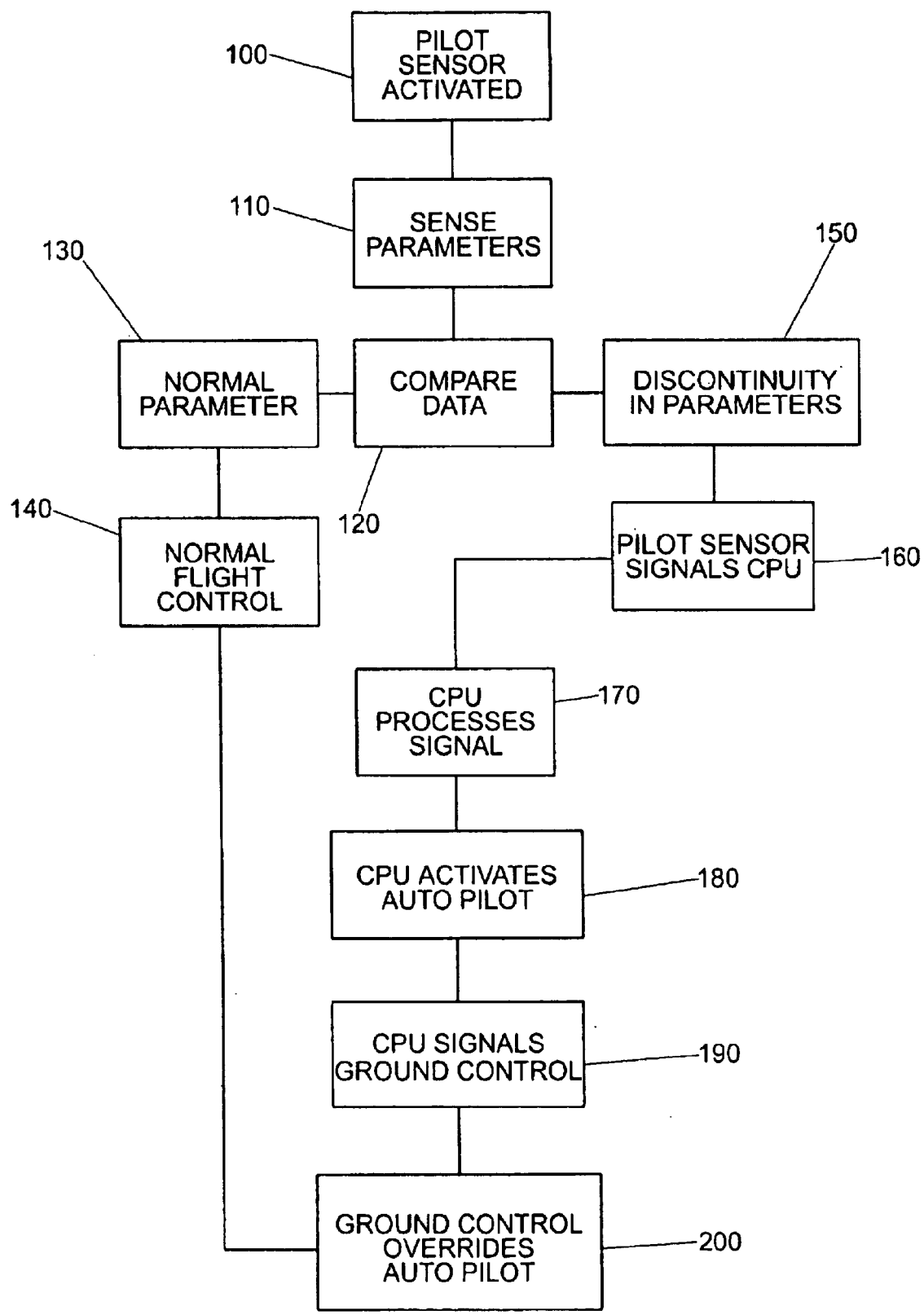
FIG. 2 is a flowchart of the operation of the exemplary anti-terrorist pilot sensor system.

Referring to FIG. 2, a flowchart of the operation of the exemplary anti-terrorist pilot sensor system is illustrated. The operation of the exemplary anti-terrorist pilot sensor system requires that the system be installed into an aircraft. With the system components in place, the pilot and/or the co-pilot, or any other crewmember that will take command of the aircraft can activate the system. For simplicity, and by no means limiting the scope of the invention, the pilot will be the primary user of the system. The pilot sensor is activated as shown in block 100. The pilot sensor is activated when the pilot attaches the pilot sensor proximate to the pilot's body, and the pilot then enters a code through the input component and the pilot sensor stores the code for future use during the flight or in other embodiments, other periods of time, such as a week, a month, and the like. The pilot sensor is activated with entry of the code. The pilot sensor senses the biometric and/or physiological parameters of the pilot, block 110, and compares the sensed data with a standard set of biometric and physiological parameters for the pilot stored in a memory as data. The biometric and physiological data of the user can also be stored in the aircraft central processor unit. The biometric parameters can be compared, block 120, to biometric parameters of the user, stored as data in a memory. If the biometric parameters are determined to be acceptable matches, then the pilot sensor remains activated. The acceptable matches indicate normal parameters, block 130, and a normal operating condition. Then the aircraft will remain in a normal flight control mode, block 140.

The pilot sensor can also monitor the physiological parameters of the user. Certain ranges of the physiological parameters can be stored in the memory. The physiological parameters can be associated with various external stimuli the pilot may experience. The pilot can have an elevated heart rate due to being nervous or scared. The pilot may have very low or no blood pressure in a case of pilot injury or death. The pilot sensor can monitor the biometric and physiological parameters of the pilot through the biometric sensors and physiological sensors. If any of the parameters fail to match the recorded parameters of the pilot that is compared from the memory then a discontinuity in the parameters exists, block 150. Upon sensing a discontinuity, the pilot sensor can send a signal to the aircraft central processor unit, block 160. The aircraft central processor unit can then perform a command and control process, block 170. If certain conditions are met, the aircraft central processor unit can send a signal to the autopilot device to activate the autopilot, block 180. The aircraft can then be flown on autopilot and manual control can be deactivated. The aircraft central processor can also send an emergency signal to ground control informing ground control of the conditions aboard the aircraft, block 190. If conditions aboard the aircraft are returned to a normal status, or the ground control determines a need, then override of the autopilot is available to the ground control. The ground control can send a command signal to the override that allows for manual control of the aircraft and deactivates the autopilot, block 200.

In an offnormal condition, such as a terrorist attack on the pilot or even a health emergency of the pilot, the pilot can exhibit abnormal physiological parameters and/or the biometric sensor will sense that the biometric parameters are no longer acceptable matches and a discontinuity of the parameters will exist (i.e. the pilot sensor has been detached from the pilot). The discontinuity of the biometric parameters and/or the physiological parameters sensed by the pilot sensor can trigger a signal to be sent to the aircraft central processor unit. The system can place the aircraft on autopilot to prevent manual control of the aircraft by unauthorized users, such as highjackers, and terrorists. By placing the aircraft into autopilot as well as sending out an emergency signal to ground control, the aircraft can remain on a safe flight path. The ground control can activate emergency procedures, monitor the aircraft flight systems and cabin, and provide remote assistance. While the aircraft is on autopilot, any highjacker can be prevented from altering the course of the aircraft and placing the aircraft in harms way. A return to normal parameters can also be an event that allows for deactivation of the autopilot and a return to the manual flight control. For example, a disconnection of the pilot sensor from the communication path can trigger the autopilot and a reconnection of the pilot sensor can allow for return to manual control.

Figure 3:
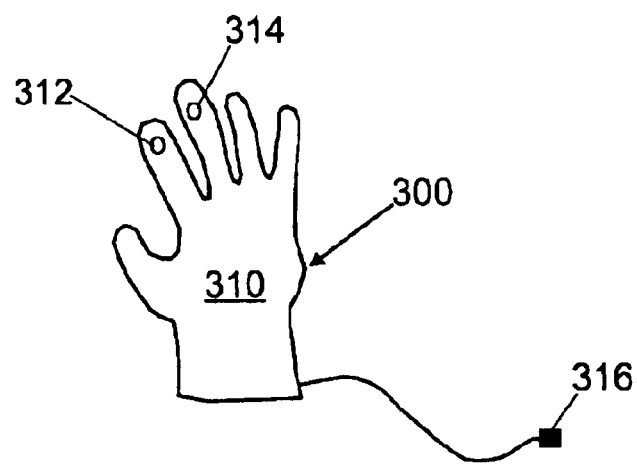
FIG. 3 is a diagram of an exemplary anti-terrorist aircraft pilot sensor glove.
Figure 4:
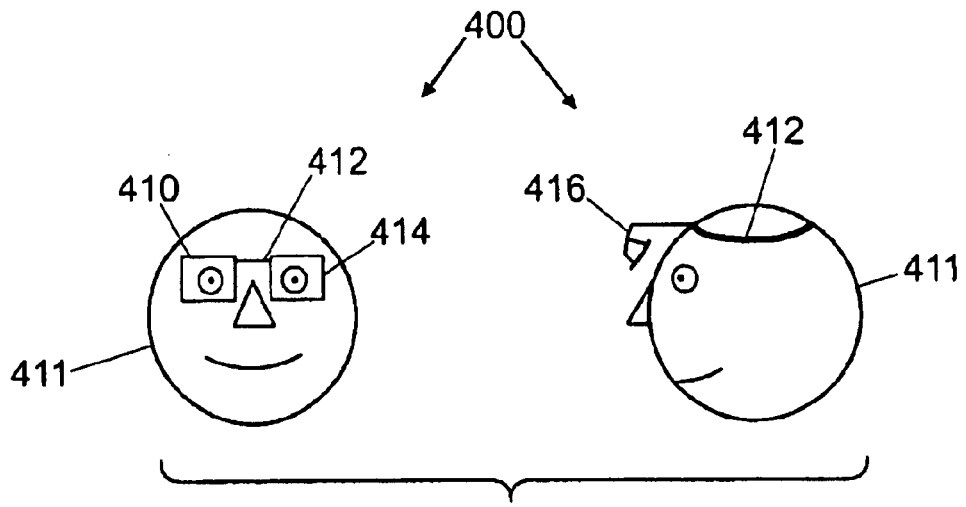
FIG. 4 is a diagram of an exemplary anti-terrorist aircraft pilot sensor headgear.

FIGS. 3 and 4 illustrate exemplary embodiments of pilot sensors 300 and 400. The embodiment of FIG. 3 is a pilot sensor 300 in the form of a glove 310. It is also contemplated that a pair of gloves (not shown) can be employed in an embodiment. The glove 310 includes a physiological sensor (vital function sensor) 312 and a biometric sensor (identification sensor) 314. The sensors can be placed at various locations on the glove 310 that are conducive to sensing the parameters. In one embodiment, the biometric sensor 312 can be located proximate to at least one fingertip to sense a fingerprint. The physiological sensor 314, in one embodiment, can be located proximate to the wrist to sense a pulse. It is contemplated that the location of the sensors will depend on the type of sensor employed. A cord 216 can be coupled to the glove 310 to operatively couple the glove 310 to the aircraft central processor unit (not shown). The cord 316 can be adapted for connection and disconnection to the input component (not shown) or other peripherals, such as a power source, battery charger, aircraft systems, and the like.

FIG. 4 illustrates another exemplary embodiment of the pilot sensor 400. The pilot sensor 400 is made up of a head set 410 worn on a pilot's head 411, including at least one physiological sensor 412 and at least one biometric sensor 414. The biometric sensor 414 and the physiological sensor 412 can read directly into the eye. The biometric sensor 414 can sense the eye retina pattern of the eye and the physiological sensor 412 can sense the pulse in the eye. In another embodiment, the physiological sensor 412 can be located along the head or even near the neck to sense various physiological parameters. Included with the headset 410 can be the input component 416 that can receive a visual or video input from the pilot or in the cockpit. Other video or audio equipment can be employed in parts of the aircraft to provide information to ground control.

Figure 5:
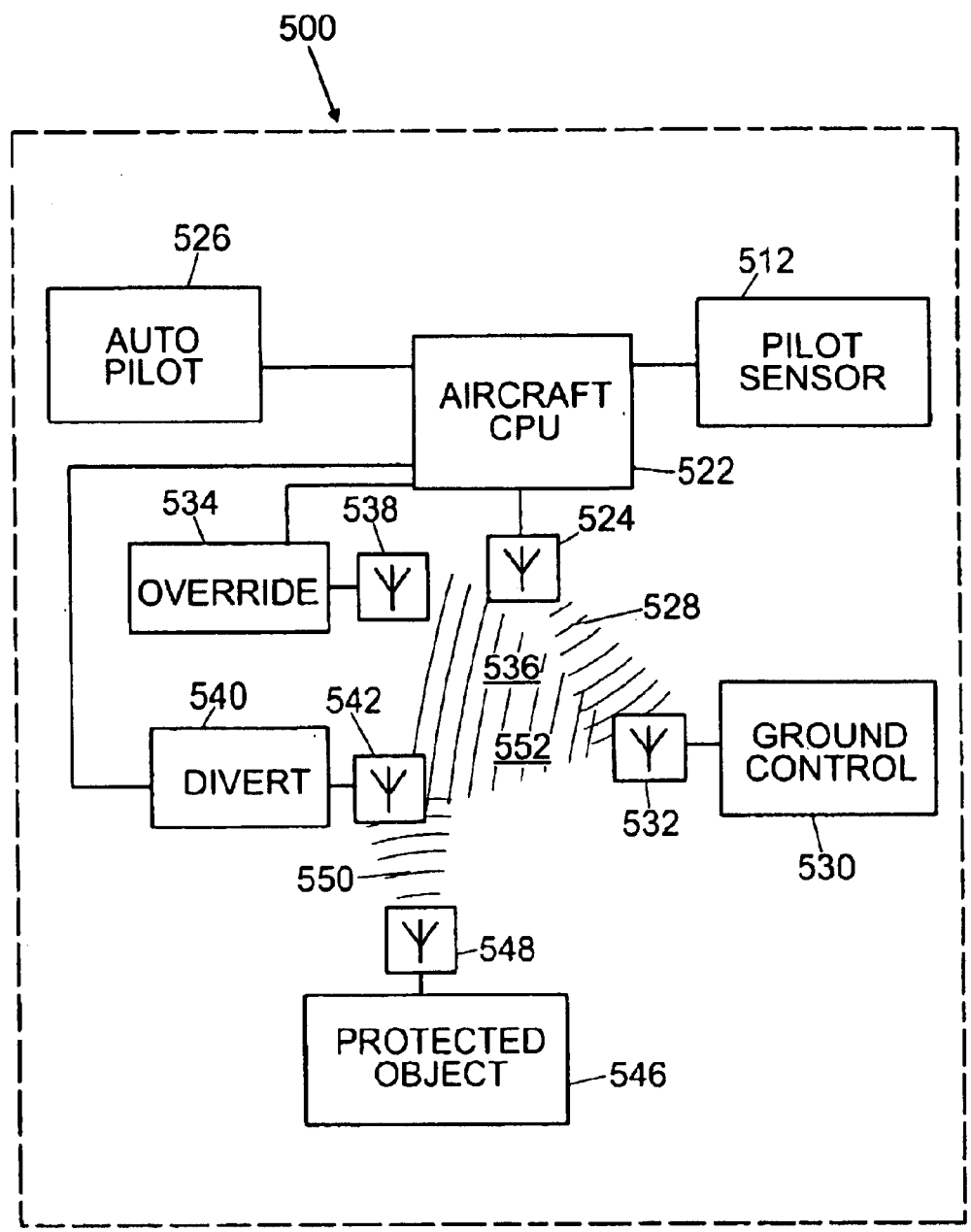
FIG. 5 is a schematic of another exemplary anti-terrorist aircraft pilot sensor system.

FIG. 5 illustrates another embodiment of an anti-terrorist aircraft pilot sensor system 500. The anti-terrorist aircraft pilot sensor system 500 of this embodiment is similar to the anti-terrorist aircraft pilot sensor system 10 described above with additional elements. The anti-terrorist aircraft pilot sensor system 500 includes the pilot sensor 512 operatively coupled to the aircraft central processor unit 522. The aircraft central processor unit 522 is operatively coupled to the auto pilot 526 and the manual flight control override, (emergency override) 534 having a transceiver 538. The aircraft central processor 522 is in operative communication via the transceiver 524 with the ground control 530 through the ground control transceiver 532. Both the emergency signal 528 and the emergency override signals 536 are also included in the embodiment.

The anti-terrorist aircraft pilot sensor system 500 includes an additional element, an emergency divert element 540 and transceiver 542 coupled to the emergency divert element 540. The emergency divert element 540 is operatively coupled to the aircraft central processor unit 522 and can place the aircraft on a safe flight path away from protected objects 546. The protected objects 546 include a transceiver 548 that emits a divert beacon 550 into the airspace around the protected object 546. The divert beacon 550 is a radio frequency signal at any frequency convenient for emitting signals to aircraft. The divert beacon 550 is similar to a lighthouse beacon that is emitted out into an area in order to warn and divert aircraft away from the protected object 546 in order to prevent collisions with the protected object 546. The protected object 546 can include, but is not limited to, buildings of significance that are perceived as threatened by possible aircraft collision, national treasures, military assets, skyscrapers, ships, geographic or topographical places of interest, such as mountains near flight paths and the like. The divert element 540 is also in operative communication with the ground control 530 and can receive an emergency divert signal 552 from ground control 530 in order to place the aircraft on a safe flight path out of harms way. The divert element 540 can operate independently of the pilot sensor 512, as well as the ground control 530.

Figure 6:
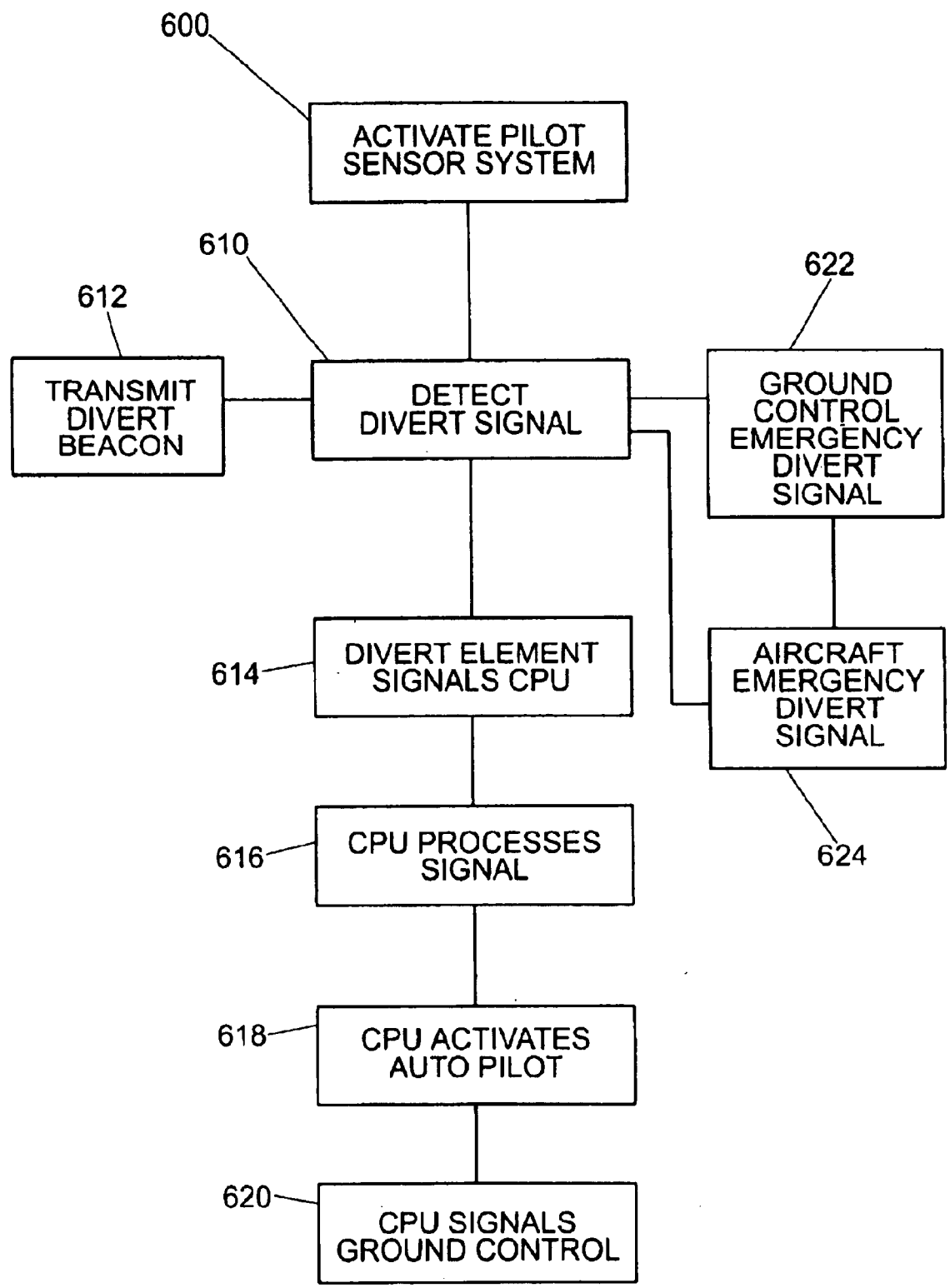
FIG. 6 is a flowchart of the operation of another exemplary anti-terrorist pilot sensor system.

Referring to FIG. 6, in operation, the anti-terrorist aircraft pilot sensor system is in an activated state, block 600. In the event that the aircraft deviates from the normal flight path and approaches a protected object 546, the emergency divert element transceiver 542 receives the divert beacon 550, block 610, being emitted from the transceiver 548, block 612. The emergency divert element 540 sends a signal to the aircraft central processor unit 522, block 614. The aircraft central processor unit 522 can process the signal and perform command and control processing, block 616. The emergency divert element 540 can be programmed with a variety of divert flight paths that are safe flight paths for the aircraft. The divert element 540 can provide optional flight paths to the aircraft central processing unit 522 that divert the aircraft away from the protected object 546 and direct the aircraft onto a safe flight path. The manual control can be deactivated and the aircraft can be placed on autopilot on the divert flight path block 618. The aircraft central processor unit 522 can send an emergency signal 528 to the ground control 530, block 620. In addition, ground control 530 can also send an emergency divert signal 552 to the emergency divert element 540, block 622, as ground control senses a need to divert the aircraft.

In an alternate embodiment, other aircraft can divert the aircraft that is off course or heading toward a protected object. For example, military aircraft patrol the airspace above protected objects or in protected airspace (e.g., near the nations capitol). The military pilot on patrol can identify and detect aircraft that deviate from commercial flight paths, or even take a course toward a protected object. Instead of merely resorting to firing on the aircraft in the attempt to destroy the aircraft before it collides with the protected object, the military pilot can send a signal to the divert element 540. The aircraft emergency divert signal (block 624 at FIG. 6) can be directly sent to the divert element 540 or to the ground control 530 which can then transmit the emergency divert signal to the divert element 540. The divert element can automatically divert the aircraft and place it on a safe flight path. The use of the anti-terrorist aircraft pilot sensor system with the divert element avoids the need to take extreme measures such as destroying the aircraft. This is especially beneficial near heavily populated areas, where even though destroying the aircraft protected the object, falling debris may cause injury, destruction and collateral damage.

The divert beacon 550 can be placed on special aircraft, tall buildings, military bases, ships laden with potentially lethal cargo, such as deadly chemicals, and the like. The divert beacon 550 can have optimum ranges so that the protected objects 546 are safe while minimizing the impacts on commercial flight paths. The emergency divert element 540 can be fully integrated into the anti-terrorist aircraft pilot sensor system 500. The above discussed military aircraft can also utilize the anti-terrorist aircraft pilot sensor system to monitor the conditions aboard the aircraft that deviates from the flight path. Having the onboard information gathered from the pilot sensor, a pilot can make a better informed decision on what actions to take toward the aircraft.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An anti-terrorist aircraft pilot sensor system comprising:
   a pilot sensor;
   an aircraft central processor unit operatively coupled to said pilot sensor, said aircraft central processor unit including a transceiver operatively coupled to said aircraft central processor unit;
   an autopilot of an aircraft operatively coupled to said aircraft central processor unit;
   a ground control remote from the aircraft operatively coupled to said aircraft central processor unit, said ground control including a transceiver coupled to said ground control;
   an aircraft override operatively coupled to said ground control and operatively coupled to said aircraft central processor unit;
   a divert element operatively coupled to said central processor unit, said divert element including a transceiver, said ground control being in operative communication with said divert element; and
   a protected object including a transceiver, said protected object including a divert beacon, said protected object in operative communication with said divert element.

2. The anti-terrorist aircraft pilot sensor system of claim 1 wherein said ground control includes an emergency divert signal and said emergency divert signal is communicated to said divert element.

3. The anti-terrorist aircraft pilot sensor system of claim 1 wherein said divert element includes at least one divert flight path.

4. The anti-terrorist aircraft pilot sensor system of claim 1 wherein said protected object is selected from the group consisting of ships, skyscrapers, military assets, national treasures and geographic places of interest.

5. The anti-terrorist aircraft pilot sensor system of claim 1 wherein said divert element can operate independently of said pilot sensor.

6. A method of operating an anti-terrorist aircraft pilot sensor system comprising:

activating the anti-terrorist aircraft pilot sensor system;

detecting a divert beacon transmitted from a protected object;

transmitting a signal from a divert element to a central processor unit of the aircraft that said divert beacon exists;

processing said signal in said central processor unit; and activating an aircraft autopilot onto a divert flight path.

7. The method of operating an anti-terrorist aircraft pilot sensor system of claim 6 further comprising:

transmitting an emergency divert signal from a ground control to said divert element of the aircraft.

8. The method of operating an anti-terrorist aircraft pilot sensor system of claim 6 wherein said activating said anti-terrorist aircraft pilot sensor system includes activating a pilot sensor.

9. The method of operating an anti-terrorist aircraft pilot sensor system of claim 6 further comprising:

transmitting a signal to a ground control.

10. The method of operating an anti-terrorist aircraft pilot sensor system of claim 6 wherein said detecting a divert beacon transmitted from a protected object is detected by said divert element.

11. The method of operating an anti-terrorist aircraft pilot sensor system of claim 6 further comprising:

deactivating said aircraft autopilot;

returning manual flight control to the aircraft.

12. The method of operating an anti-terrorist aircraft pilot sensor system of claim 6 further comprising:

transmitting a divert beacon from said protected object.

13. The method of operating an anti-terrorist aircraft pilot sensor system of claim 6 further comprising:

transmitting an emergency divert signal from another aircraft to said divert element.

14. The method of operating an anti-terrorist aircraft pilot sensor system of claim 6 further comprising:

transmitting an emergency divert signal from another aircraft through said ground control to said divert element.

\* \* \* \* \*